(12) United States Patent
Mackinnon

(10) Patent No.: US 6,412,598 B1
(45) Date of Patent: Jul. 2, 2002

(54) TEMPORARY FALL PROTECTION SYSTEM

(75) Inventor: Alan Mackinnon, Worton, MD (US)

(73) Assignee: Corman Construction, Inc., Annapolis Junction, MD (US)

( * ) Notice: Subject to any disclaimer, the term of this patent is extended or adjusted under 35 U.S.C. 154(b) by 0 days.

(21) Appl. No.: 09/796,991

(22) Filed: Mar. 1, 2001

Related U.S. Application Data

(60) Provisional application No. 60/185,988, filed on Mar. 1, 2000.

(51) Int. Cl.$^7$ ................................................ A47L 3/04
(52) U.S. Cl. ........................ 182/3; 182/4; 182/113; 248/613; 403/235
(58) Field of Search ........................... 182/3, 8, 13, 18, 182/113; 248/125.2, 613; 403/235

(56) References Cited

U.S. PATENT DOCUMENTS

| | | | | |
|---|---|---|---|---|
| 974,687 A | * | 11/1910 | McLeod ................ 248/613 X |
| 3,480,257 A | | 11/1969 | Bourn et al. ................ 256/59 |
| 3,632,089 A | | 1/1972 | Smith .......................... 256/47 |
| 3,920,221 A | | 11/1975 | Berry et al. ................ 256/59 |
| 4,037,824 A | | 7/1977 | Whitmer ..................... 256/53 |
| 4,122,451 A | * | 10/1978 | Senoh .................... 248/613 X |
| 4,741,505 A | * | 5/1988 | Anderson ................... 248/357 |
| 5,011,106 A | * | 4/1991 | Cody .......................... 182/3 X |
| 5,029,670 A | | 7/1991 | Whitmer ..................... 182/113 |
| 5,143,187 A | * | 9/1992 | McQuarrie et al. ......... 182/3 X |
| 5,212,919 A | | 5/1993 | Shaw et al. ................ 52/126.6 |
| 5,307,897 A | | 5/1994 | Turner et al. ................... 182/3 |
| 5,339,475 A | | 8/1994 | Jaeger et al. .................. 14/73 |
| 5,358,068 A | * | 10/1994 | Whitmer ..................... 182/3 X |
| 5,458,214 A | * | 10/1995 | Olson et al. ................ 182/3 X |
| 5,581,955 A | * | 12/1996 | Gleave ....................... 182/8 X |
| 5,637,065 A | * | 6/1997 | Chang ....................... 482/114 |
| 5,863,020 A | * | 1/1999 | Olson et al. ................ 182/3 X |
| 5,964,316 A | * | 10/1999 | Roy .............................. 182/3 |
| 6,036,146 A | | 3/2000 | Paterson .................. 248/125.2 |
| RE36,970 E | * | 11/2000 | Keller ........................ 403/235 |
| 6,173,809 B1 | * | 1/2001 | Cole et al. ..................... 182/3 |

* cited by examiner

*Primary Examiner*—Bruce A. Lev
(74) *Attorney, Agent, or Firm*—Holland & Knight, LLP

(57) ABSTRACT

A temporary safety line system which is employed in protecting construction workers on the job site. The system is adapted to be removably interconnected to the surface of a structural beam, such as an I-beam. The system includes a series of intermediate posts assemblies and end posts assemblies which support a tensioned safety line. The safety line, in turn, is secured at its ends to anchor post assemblies. Each of the post assemblies is removably secured to a stud that is welded to the surface of a structural beam. These studs perform two functions. First, the studs allow individual post assemblies to be temporarily and positively secured to the underlying structural beam. Second, the studs function in binding poured concrete to the structural beam once the safety line system is removed.

10 Claims, 8 Drawing Sheets

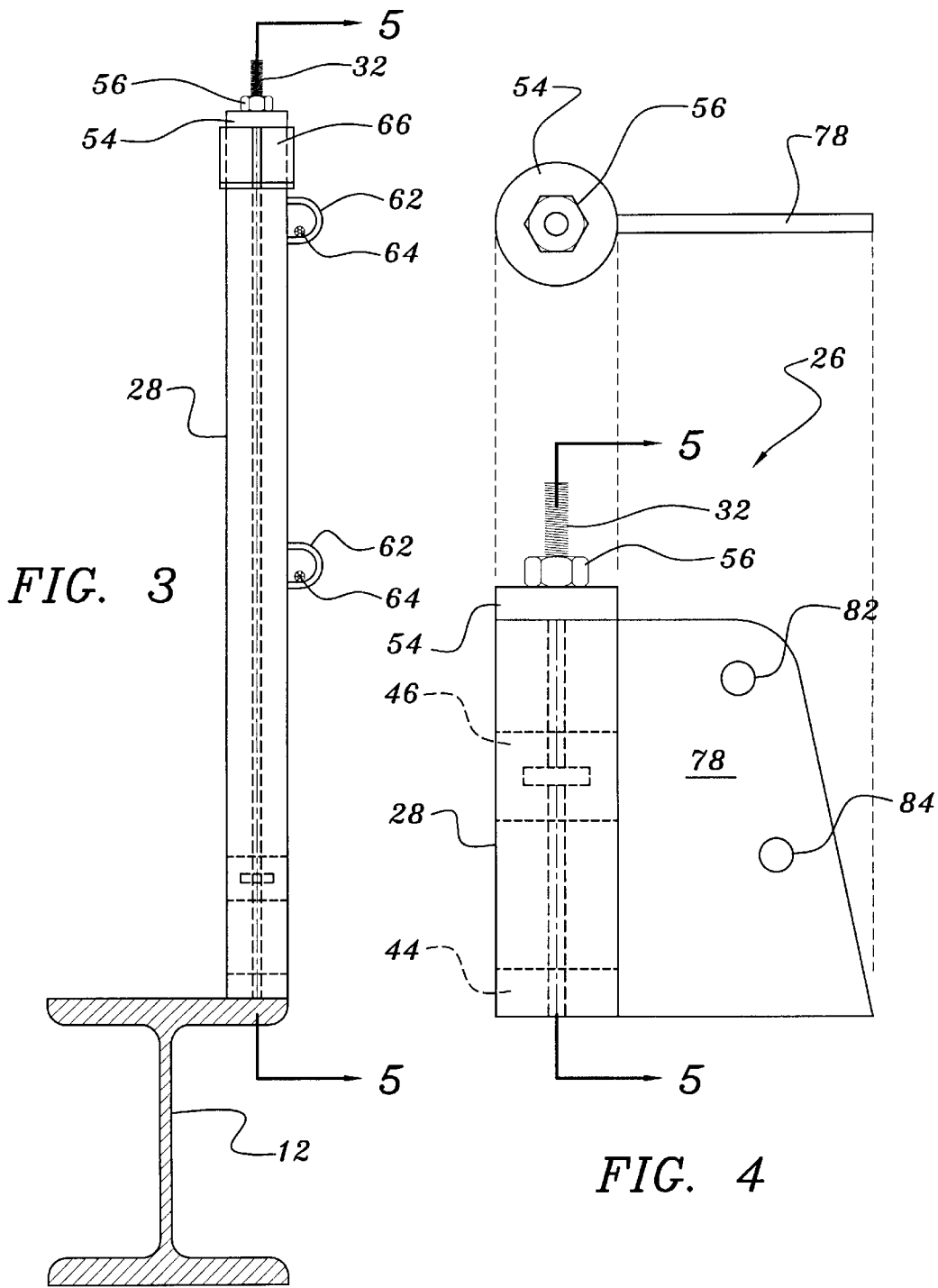

TEMPORARY FALL PROTECTION SYSTEM

RELATED APPLICATION DATA

This application claims priority from provisional application Serial No. 60/185,988 filed on Mar. 1, 2000 entitled Temporary Fall Protection System for Structural Steel Erection, the contents of which are incorporated herein by reference.

BACKGROUND OF THE INVENTION

1. Field of the Invention

This invention relates to a temporary fall protection system. More particularly, the present invention relates to a fall protection system which can be removably interconnected to the surface of a structural beam by way of a series of studs.

2. Description of the Background Art

Presently guardrail stanchions are utilized during the construction of buildings to increase the safety of construction workers on the job site. These stanchions are necessary because often times construction work is done many stories up in the air. Moreover, construction sites seldom have any permanent structures in place to adequately protect workers from the results of a fall, or to protect persons on the ground from falling objects. As a result it is advantageous to temporarily install guardrails to provide for the safety of both construction workers and non-construction workers alike.

In order to be effective, guardrails should meet a number of requirements. First, the guardrail must be easily installable to allow it to be quickly erected, thereby minimizing the time period in which no safety device is present. Second, the guardrail must be such that it can be firmly secured to a portion of the building already erected, thereby preventing the failure of the guardrail. Lastly, the guardrail must be easily removable to make way for the building as it is being constructed. Prior guardrails have been missing in one or more of these aspects and, thus, ineffective.

One example of a safety cable system is disclosed in U.S. Pat. No. 6,036,146 to Paterson. Paterson discloses a stanchion assembly which is adapted to be removably secured to an I-beam. The stanchion is secured by way of a base plate that slides under the bottom face of a flange of the I-beam, and a clamp rod which hooks around an opposite end of the I-beam flange. Additionally, a clamping bolt is adapted to tighten down onto the I-beam.

Furthermore, U.S. Pat. No. 5,307,897 to Turner, et al., discloses a safety stanchion for a fall protection system. The stanchion includes a base portion with a lateral slot adapted to receive the flange of an I-beam. The stanchion further includes a hook which is secured over an opposite end of the I-beam. A winch is thereafter employed to tension the hook.

U.S. Pat. Nos. 5,029,670 and 4,037,824 to Whitmer, each disclose a safety system for construction workers. The System includes stanchions each of which are secured to an I-beam. Specifically, the stanchions are secured by a support with stationary and moveable jaws. The jaws are employed in engaging the underside of opposing ends of an I-beam.

U.S. Pat. No. 3,920,221 to Berry, et al., discloses a construction safety anchor means which includes a post interconnected to an I-beam by a pair of opposing flanges which engage the underside of the beam. The two flanges are interconnected by way of a screw.

Lastly, U.S. Pat. No. 3,480,257 to Bourn, et al., discloses a guardrail stanchion which includes an upright member that is interconnected to a horizontal support and an L-shaped clamping member. Furthermore, locking means are included for securing the L-shaped number relative to the horizontal support.

Although each of the above referenced inventions achieved its individual objective they also suffer from common problems. Namely each of the previously described assemblies are secured over the entire surface of the underlying structural beam. In other words, the previously described assemblies extend over the surface of the beam to engage its opposing ends. The result is that construction workers have to step over the assembly when they are traversing the beam. Obviously, this is a dangerous and unwanted result. Furthermore, each of the previously described assemblies are secured to upper and lower surfaces of the underlying structural beam. Such a interconnection complicates the installation process insomuch as the underside of the structural beam is not always accessible. Thus, none of the previously described systems can be employed on a beam with an inaccessible lower surface. Finally, each of the previously described assemblies are secured via the application of opposing forces to upper and lower surfaces of the underlying structural beam. In other words, the safety systems are anchored by placing the underlying structural beam in torsion. This is undesirable insomuch as such forces may warp or deform the underlying beam.

SUMMARY OF THE INVENTION

It is therefore one of the objectives of this invention to provide a fall protection system which can be easily installed and removed.

It is also an object of this invention to provide a fall protection system which is temporarily secured to the surface of a structural beam.

It is another object of this invention to provide a fall protection system which minimally interferes with the path of construction workers as they traverse the structural beam.

These and other objectives are accomplished by providing a safety system which is removably interconnected to the surface of a structural beam. The system includes a series of studs which are welded to the beam. Each stud has an upper enlarged head. The system also includes a series of post assemblies including intermediate post assemblies, end post assemblies and anchor post assemblies.

The intermediate and end post assemblies are each formed from an elongated hollow pipe with opposed opened ends. An elongated threaded rod is positioned within the pipe. Each post assembly further includes a split collar that is positioned about the lower end of the stud and acts as a spacer between the stud and the surrounding pipe. A clamping block is secured to the second end of the rod. This block has an internal counter bore that is dimensioned to fit over the head of the stud. A side opening is included in the block which allows the block to be easily slid over the stud head. The clamping block is dimensioned to fit within the interior of the pipe.

An apertured plate is secured over the second end of the rod as well as the second end of the pipe. Furthermore, a nut is threadably secured to the second end of the rod over top of the plate. This assembly effectively closes the second end of the pipe. The pipe additionally includes a safety cable rail which is secured to its outer surface and which is adapted to guide a safety line. The pipe assembly is closed when the counter bore of the clamping block is secured over the head of the stud and when the first open end of the pipe is secured over the clamping block, the stud and the split collar. With the pipe so secured, the entire assembly can be tensioned by tightening the nut downwardly upon the rod.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 3 is a side elevational view of one the post assemblies of the present invention.

FIG. 4 is both a plan and side elevational view of one of the anchor post assemblies of the present invention.

Similar reference characters refer to similar parts throughout the several views of the drawings.

DETAILED DESCRIPTION OF THE PREFERRED EMBODIMENT

The present invention relates to a temporary safety line system which is employed in protecting construction workers on the job site. The system is adapted to be removably interconnected to the surface of a structural beam, such as an I-beam. The system includes a series of intermediate posts assemblies and end posts assemblies which support a tensioned safety line. The safety line, in turn, is secured at its ends to anchor post assemblies. Each of the post assemblies is removably secured to a stud that is welded to the surface of the structural beam. These studs perform two functions. First, the studs allow individual post assemblies to be temporarily and positively secured to the underlying structural beam. Second, the studs function in binding poured concrete to the structural beam once the safety line system is removed. The various features of the present invention, as well as additional embodiments, will be described in greater detail hereinafter.

Figure 1:
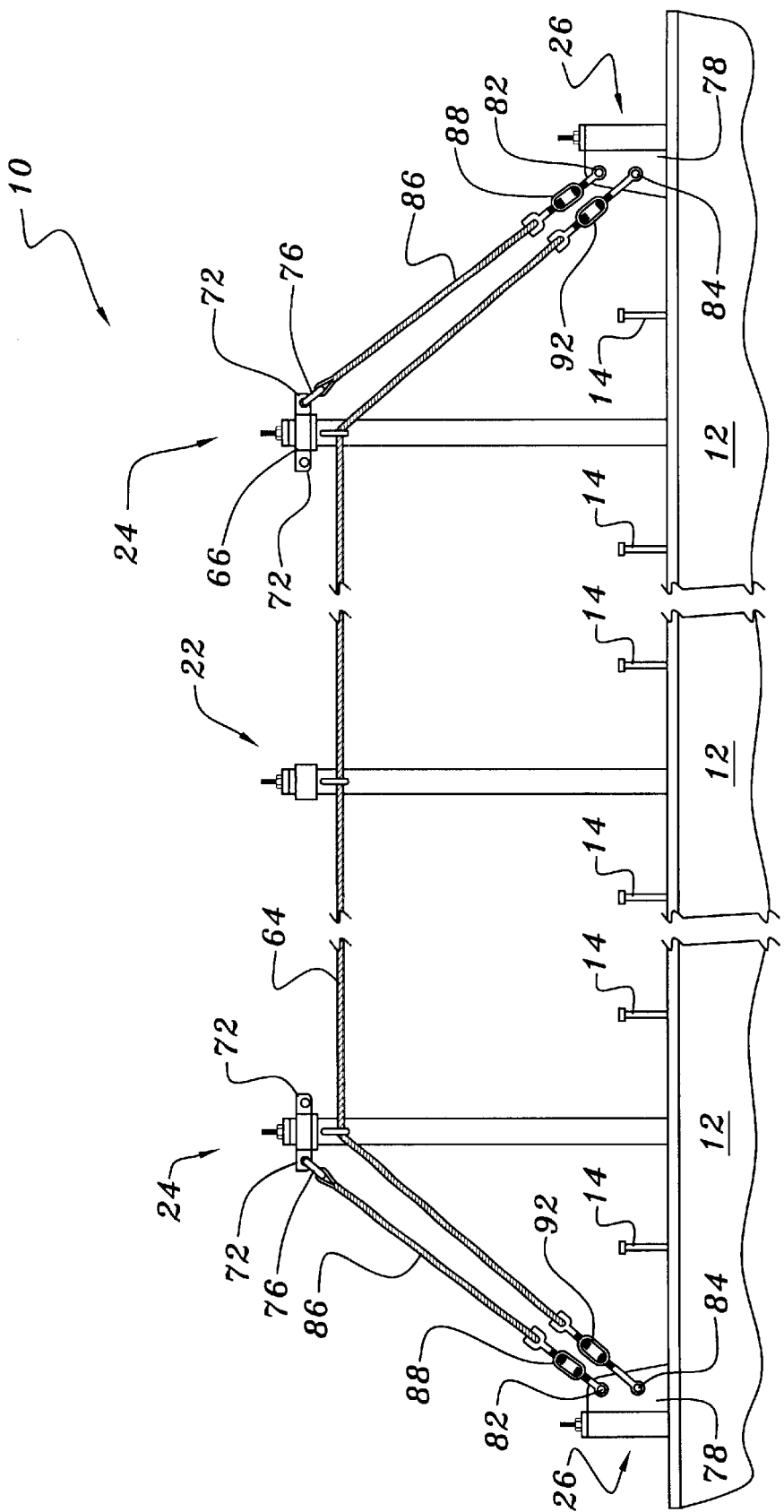
FIG. 1 is a side elevational view of the safety line system of the present invention.

With reference now to FIG. 1 the safety line system 10 of the present invention is depicted. As indicated the system 10 is adapted to be secured to the structural beam 12 of a building, or other structure, being erected. The structural beam 12 depicted in FIG. 1 is an I-beam. Nonetheless, the present invention can be employed in conjunction with a wide variety of structural beams. For reasons that will be explained hereinafter, it is often advantageous to include a series of studs 14 on the surface of such structural beams. These studs 14 include a lower end 16 that is welded to the surface of the structural beam 12 and an upper end with an enlarged head 18. One suitable stud is a Nelson® stud made by Nelson Stud and Welding of Elyra, Ohio. However, other brands of studs are suitable, as well as other fastener types. For example, it is possible to utilize a seventh-eighth inch bolt and nut in place of the stud.

The function of the studs is two-fold. First, the studs act as an anchoring point for the post assemblies of the present invention. As such, the studs function to secure the safety line system 10 which will be described in greater detail hereinafter. Second, in the absence of the safety line system 10, the studs bind poured concrete to the underlying structural beam 12. Namely, once the concrete slab is poured upon the surface of the structural beam 12, or upon the surface of a sheet metal deck secured to the surface of the structural beam 12, the studs 14 provide a composite action to the resulting structure. In other words, once the concrete hardens the structural beam and concrete bend as a single unit thereby giving the end construction a greater section modulus.

Figure 2:
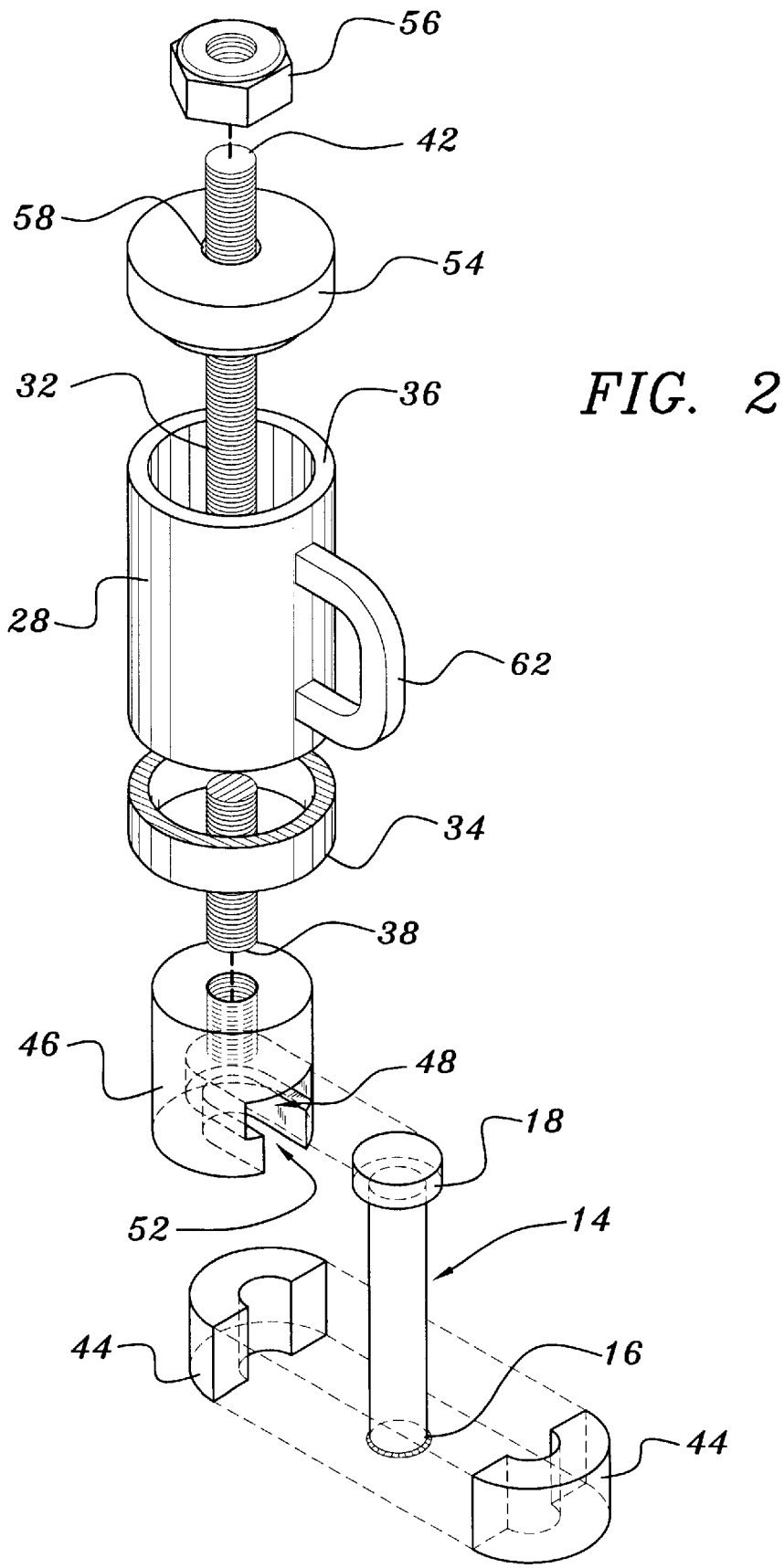
FIG. 2 is an exploded view of one of the post assemblies of the present invention.
Figure 5:
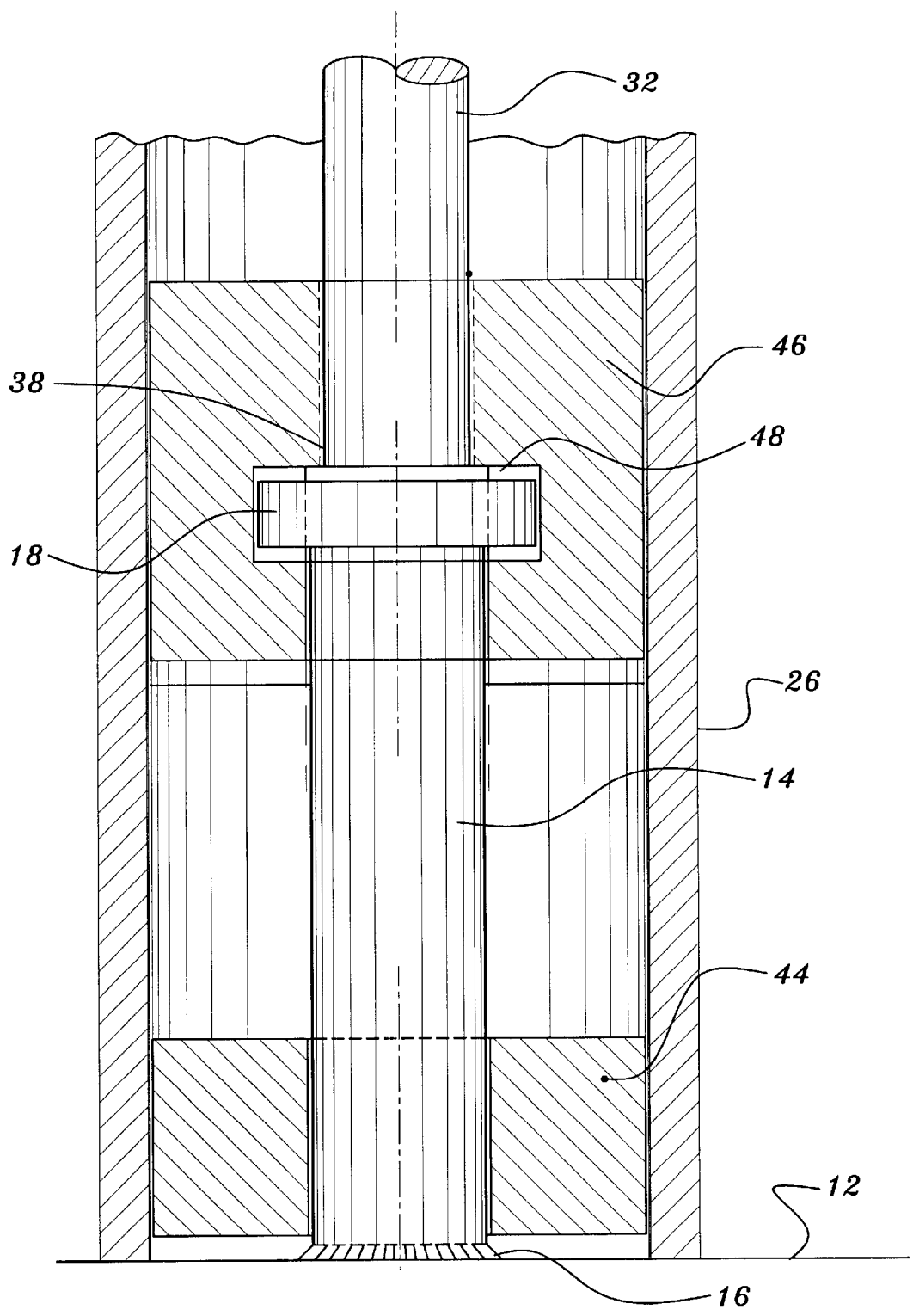
FIG. 5 is a sectional view taken along line 5—5 of both FIGS. 3 and 4.

With continuing reference to FIG. 1, the various post assemblies of the safety line system are depicted. These include: an intermediate post assemblies 22; an end post assemblies 24; and anchor post assemblies 26. Each of these post assemblies is secured in a similar fashion to an underlying stud 14. FIGS. 2 and 5 illustrate the manner in which a post assembly is secured to a stud. Namely, each post assembly (22, 24 or 26) includes a bore fitted over the head of the stud to thereby threadably interconnect the post and stud. The result is a temporary and tensioned fit between post and stud. The specifics of this interconnection are provided next.

Each post assembly includes a hollow pipe 28 with opposed open ends and an elongated threaded rod 32 positioned therein. Both the pipe 28 and the rod 32 are defined by first and second ends. Furthermore, in the case of the intermediate and end post assemblies (22 and 24), the pipe 28 is of an elongated length such that the supported safety cable is approximately three feet six inches above the surface of the structural beam. Obviously, post assemblies of varying heights, supporting safety lines at various locations, are within the scope of the present invention. FIG. 2 illustrates the post assembly as being broken to indicate that the post assembly can be of varying lengths.

As is illustrated in FIG. 2, each post assembly is adapted to be secured over a corresponding stud 14. In this regard, the post assembly includes a split collar 44 which is secured around the lower end 16 of the stud 14. This split collar 44 acts as a spacer between the stud 14 and the pipe 28 of the post assembly. Without the split collar 44, the lower end of the post assembly would be subject to unwanted movement once in position.

With continuing reference to FIG. 2, each post assembly further includes a clamping block 46. As illustrated, the block 46 is secured to the first end 38 of the rod 32. The block can be threadably secured or permanently secured by a weld. As is illustrated, this clamping block 46 is dimensioned and sized to fit within the interior of the pipe 28. This allows the pipe 28 to be completely fitted over its corresponding stud 14. The clamping block 46 additionally includes an internal counter bore 48 machined within its interior. This bore 48 is dimensioned to fit over the head 18 of a stud 14. More specifically, the bore is T-shaped to engage the head 18 and upper extent of a stud 14. The counter bore 48 further includes a side opening 52, permitting the clamping block 46 to be slid over the head 18 of a stud 14. This arrangement allows the block 46 to be slipped over a stud 14 when the block 46 is extended out the first opened end 34 of the pipe 28.

The upper end of the pipe 28 is closed by way of a plate 54 and an associated nut 56. Namely, the plate 54 includes a central aperture 58 that allows the plate 54 to be slid down the length of the threaded rod 32. The plate 54, however, is dimensioned to fit over top of the second end 36 of the pipe 28. Thereafter, the nut 56 is threaded downwardly upon the rod 32 to secure the plate 54 over the top surface of the pipe 28.

Thus, the post assembly is secured over a stud 14 as follows. First, the counter bore 48 of the clamping block 46 is slid over the head 18 of a corresponding stud 14. Thereafter, the pipe 28 is moved downwardly to cover the clamping block 46. Next, the plate 54 and nut 56 are secured to the second end 36 of the pipe 28. In this orientation, the pipe 28 covers the block 46, the stud 14, and the split collar 44. With the post assembly so positioned, the nut 56 can be tightened downwardly upon the threaded rod 32. This results in the upward movement of the threaded rod 32 as well as the clamping block 46. The tightening of the nut 56 also forces the post down on to the surface of the structural beam 12. As can be appreciated, this applies a binding force or tensioning force to the entire post assembly. This force drives the head 18 of the stud 14 into the lower portion of the counter bore 48. The end result is a positive and binding fit between the stud 14 and the post assembly.

Both the intermediate and end posts (22 and 24 respectively) include safety cable rails 62 upon the outer surface of the pipe 28. These safety cable rails 62 are adapted to guide the tensioned safety line 64 of the system 10. Although FIGS. 1 and 2 depict only one safety cable rail 62, multiple rails can be employed. For example, FIG. 3 illustrates a post assembly with two safety cable rails 62 each of which supports an individual tensioned safety line 64. Thus, the system of the present invention can be employed in retaining any number of individual safety rails 62.

Figure 6:
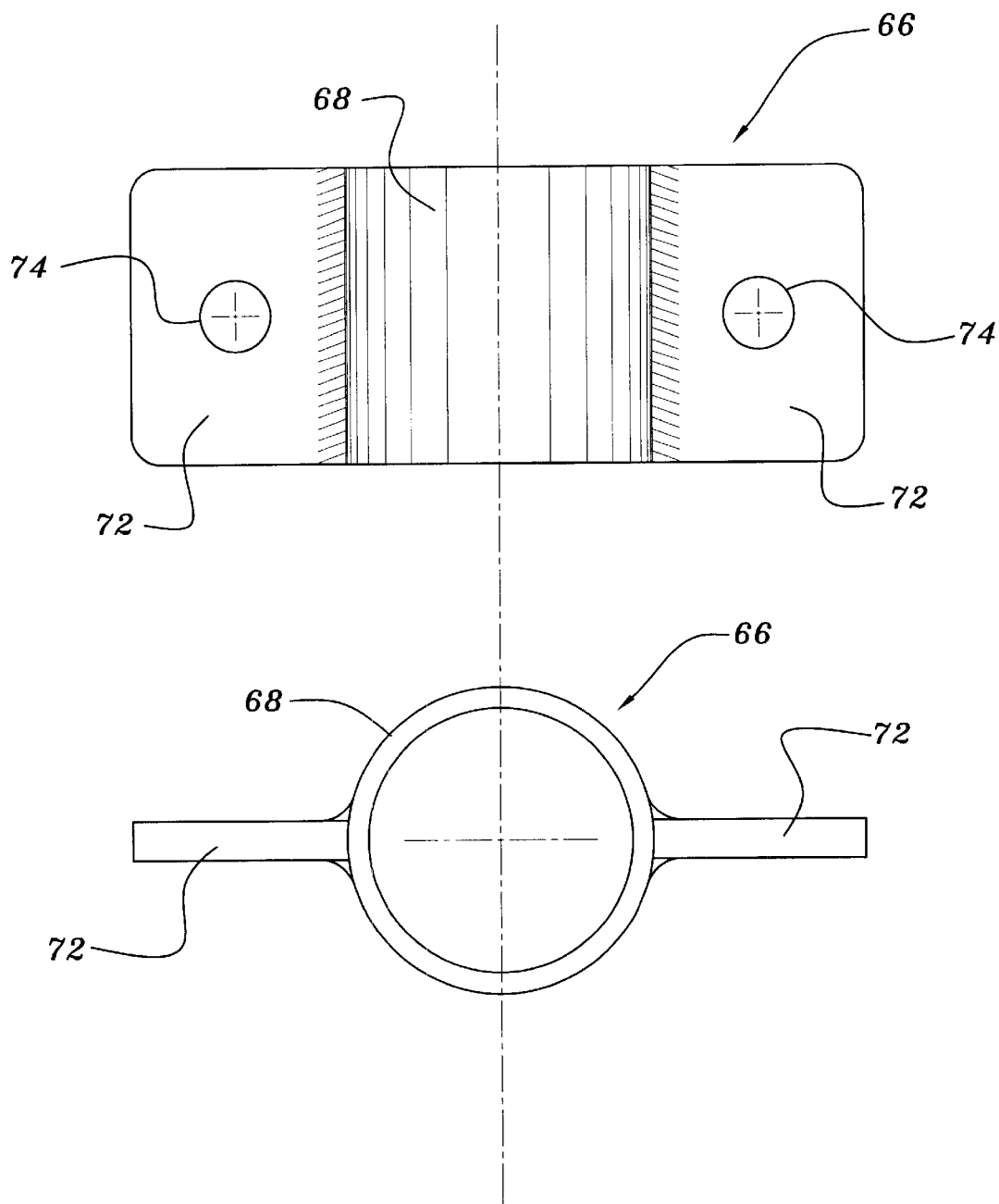
FIG. 6 is both a plan and side elevational view of one of the flanged collars which is adapted for interconnection with one of the end post assemblies of the present invention.

FIG. 1 illustrates the primary difference between the intermediate posts and the end posts, 22 and 24 respectively. Namely; the end posts 24 support a flanged collar 66 which is positioned over the upper extent of the pipe 28. This flanged collar 66 allows an anchor line to be secured in between an end post 24 and an anchor post 26. FIG. 6 is a detailed view of the flanged collar 66. The collar 66 includes a cylindrical extent 68 dimensioned to fit over the pipe 28 of the end post assembly 24. At opposite ends of the cylinder 68 are apertured flanges 72. This arrangement permits one collar type to be used at either end of the system 10. The apertures 74 allow for the attachment of the anchoring line 86 by way of a clevis and bolt combination 76. Other line fastening devices are within the scope of the present invention. The flanged collars 66 are secured to the end post assemblies 24 by passing the cylindrical extent 68 over the pipe 28. Thereafter, a ring is welded to the pipe 28 at a location beneath the flanged collar 66. This permits rotation and upward movement of the flanged collar 66.

With reference to FIG. 4 an anchor post assembly 26 of the present invention is depicted. The anchor post assembly 26 is secured to a corresponding stud 14 in the manner previously described in conjunction with the intermediate and end post assemblies, 22 and 24. That is, the anchor post 26 includes a pipe portion 28 into which is fitted a threaded rod 32. A clamping block 46 is secured at the end of the threaded rod 32. The clamping block 46 includes a bore 48 which is adapted to fit over the head 18 of a corresponding stud 14. A split collar 44 is also included at the base of the stud 14. With the anchor post 26 secured as denoted in FIG. 5, threading the nut 56 downwardly upon the rod 32 places the entire anchor post assembly 26 in tension.

The primary difference between the anchor post assembly 26 and the intermediate/end post assemblies (22 or 24) is the presence of the flange 78. As illustrated in FIG. 1, the anchor post flanges 78 are utilized in anchoring the ends of the safety line 64. Each flange 78 includes two apertures. The upper aperture 82 receives one end of the anchor line 86 with the opposite end being secured to a flange 72 of the flanged collar 66 of the end post assembly 24. The interconnection between the end of the anchor line 86 and the flange 78 can be achieved by way of a clevis and bolt combination or a similar interconnection known to those skilled in the art. As illustrated in FIG. 1, the anchor line 86 can also include a turnbuckle 88 by which the anchor line 86 can be tensioned.

The lower aperture 84 of the anchor post flange 78 receives one end of the safety line 64. Again, the end of the safety line 64 can be interconnected to the anchor post flange 78 by way of a clevis and bolt combination. A turn buckle assembly 92 is also included at the end of the safety line 64 to allow the safety line 64 to be tensioned. Lastly, as is illustrated in FIG. 1, identical anchor post assemblies 26 are included on both ends of the safety system 10 of the present invention. Consequently, two anchor lines 86 are included, and both ends of the safety line 64 are secured to opposing anchor post assemblies 26.

Figure 7:
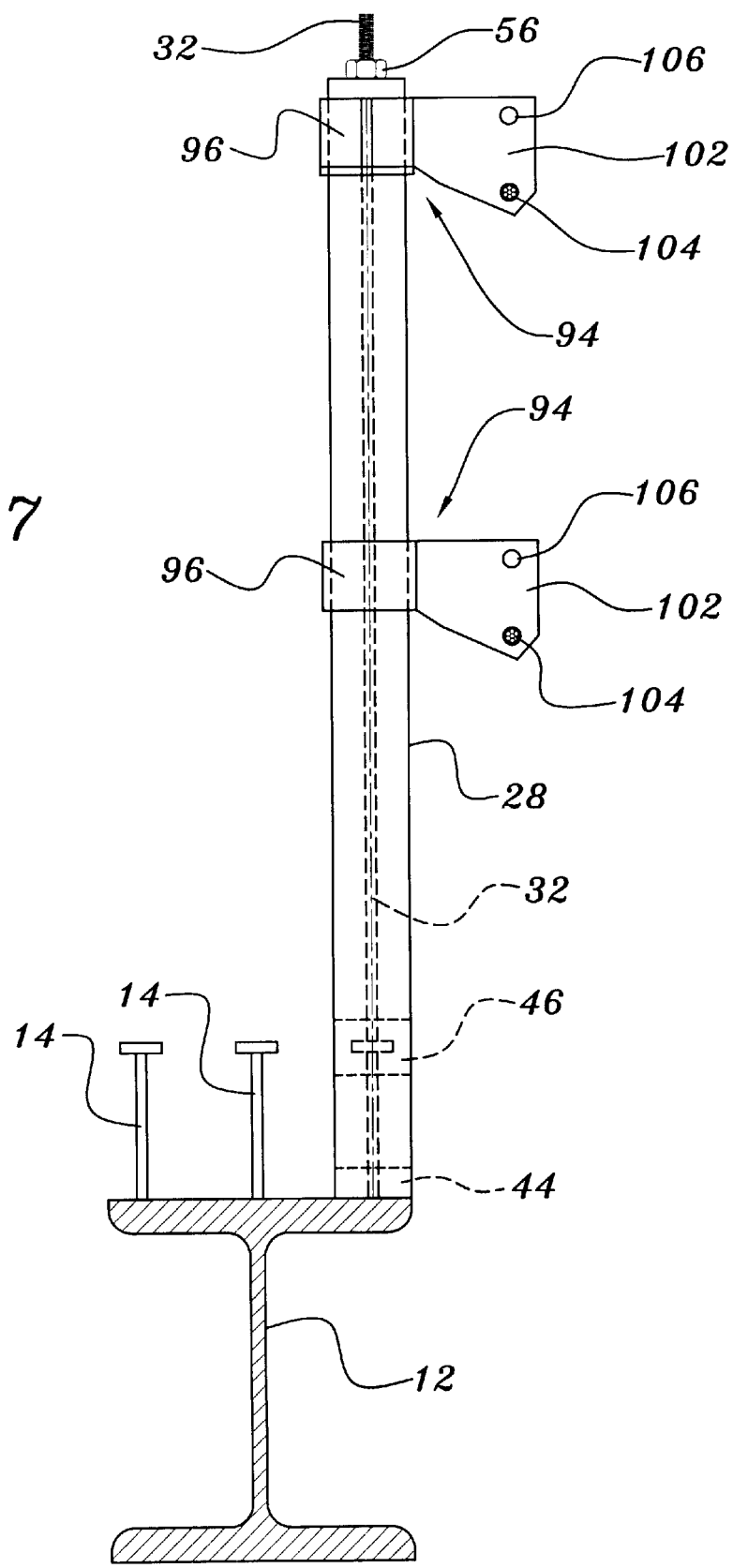
FIG. 7 is a side elevational view of one of the post assemblies with associated flanged swing arms secured along its length.
Figure 8:
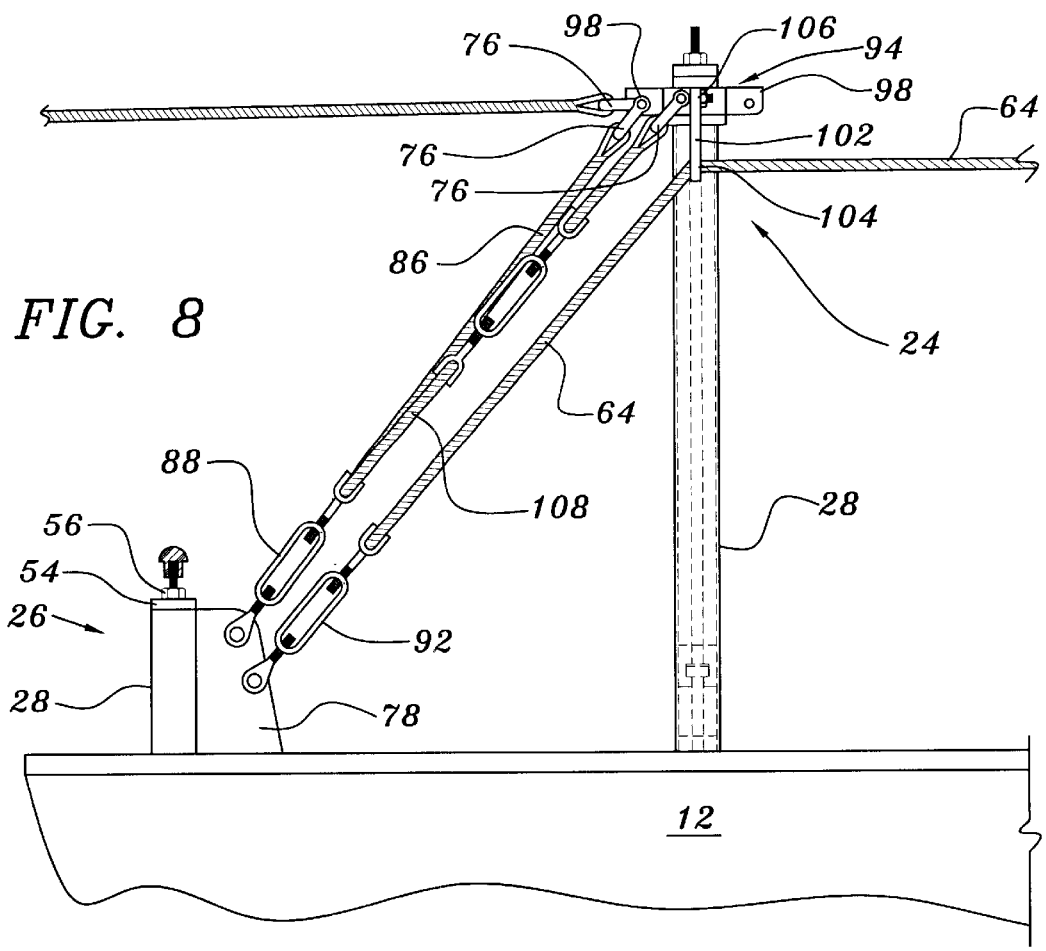
FIG. 8 is a side elevational view of one of the end post assemblies with a flanged swing arm secured along its length.
Figure 9:
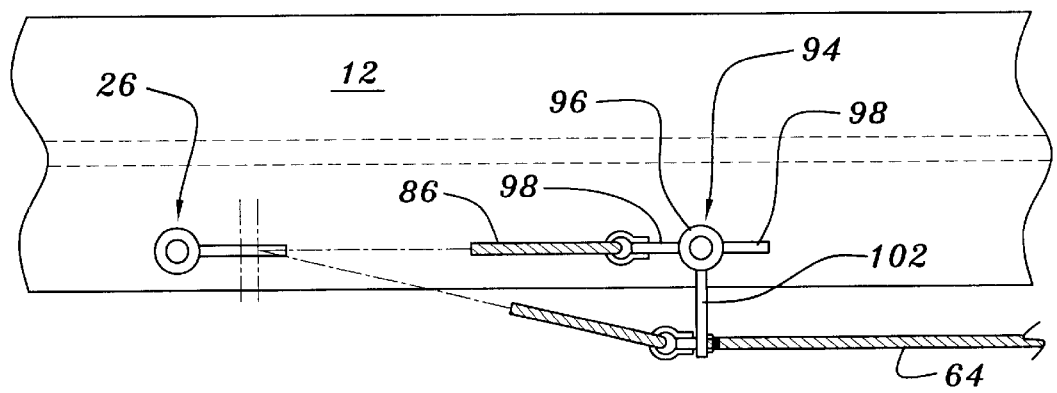
FIG. 9 is a plan view of FIG. 8.
Figure 10:
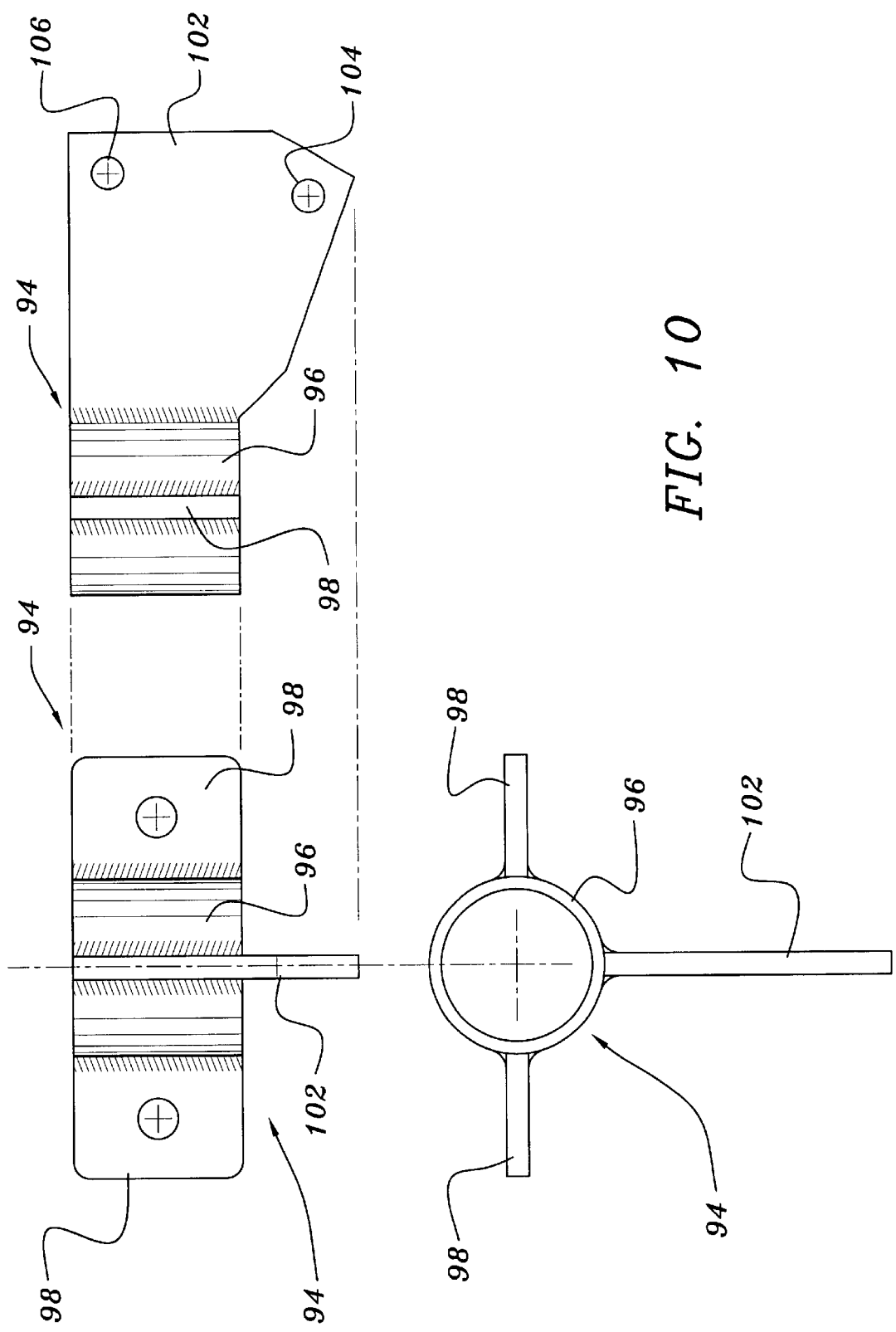
FIG. 10 contains elevational and plan views of one of the flanged swing arms adapted for interconnection with one of the end post assemblies of the present invention.

FIGS. 7 through 9 illustrate another embodiment of the present invention. This embodiment replaces the safety cable rails 62 and flanged collars 66 depicted in FIG. 3 with a flanged swing arm 94. This flanged swing arm 94 includes a cylinder portion 96 that allows it to be secured over the upper or intermediate extent of a pipe 28. With reference to FIG. 9, the relationship between the two flanged ends 98 of the collar and the swing arm 102 can be seen. Specifically, the swing arm 102 is formed upon the collar 96 at a right angle to both of the apertured flanges 98. The flanged swing arm 94 is secured over top of one of the intermediate or end posts (22 and 24) in a fashion similar to the flange collar 66 depicted in FIG. 6.

The swing arm 102 includes both lower and upper apertures, 104 and 106 respectively. The lower aperture 104 allows for the passage of the tensioned safety line 64. The width of the swing arm 102 provides for increased distance between the side edge of the structural beam 12 and the supported safety line 64. This distance provides more room for a construction worker who is traversing the structural beam 12. The upper aperture 106 of the swing arm 102 allows an additional anchor line to be connected between the end post assembly 24 and anchor post assembly 26. FIG. 8 illustrates how the flanged swing arm 94 allows dual anchor lines to be employed. The first anchor line 86 is secured in between the upper aperture 82 of the anchor post flange 78 and the apertured flange 98 of the flanged swing arm 94. The second anchor line 108 is then secured to the upper aperture 106 of the swing arm 102, as well as to a point along the length of the first anchor line 86. This arrangement prevents the swing arm from rotating.

Thus, the system is installed by first assembling each of the post assemblies. Subsequently, the anchor lines are installed in between the anchor posts and the end posts. Thereafter, the safety line is guided through the swing arms (or cable rails) and its ends secured to the anchor posts. Finally, the safety and anchor lines can be tightened via the turnbuckles.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A temporary safety line system for protecting construction workers on the job site, the system adapted to be removably interconnected to studs secured to the surface of a structural beam each of the studs having a head and a lower end, the system comprising:

a tensioned safety line;

an elongated hollow pipe with opposed opened ends and with an elongated threaded rod positioned therein, the pipe and rod having first and second ends;

a split collar adapter to be positioned about the lower end of one of the studs, the split collar acting as a spacer between the stud and the pipe;

a clamping block secured to the second end of the rod, the clamping block having an internal counter bore dimensioned to fit over the head of one of the studs, a side opening for providing access to the counter bore, the clamping block dimensioned to fit within the hollow pipe;

an apertured plate secured over the second end of the rod and pipe, a nut secured to the rod over the plate;

a safety cable rail secured to an outer surface of the pipe, the rail adapted to guide the safety line;

the counter bore of the clamping block adapted to be secured over the head of one of the studs with the first opened end of the pipe secured over the clamping block, stud and spit collar, the post assembly being tensioned by tightening the nut downwardly on the rod.

2. A post assembly for use in supporting a safety line comprising:

a structural beam upon which the safety line is adapted to be secured, the structural beam having a series of studs perpendicularly secured to an upper surface, each of the studs having an enlarged head, an elongated hollow pipe with an opened lower end and with an elongated rod positioned therein, the pipe and rod having first and second ends;

a clamping block secured to the second end of the rod, the clamping block having an internal bore secured over the head of one of the studs, the first opened end of the pipe secured over both the clamping block and stud.

3. The post assembly as described in claim 2 wherein the rod is threaded and wherein the upper end of the pipe is closed by an apertured plate and nut which are secured over the second end of the rod.

4. The post assembly as described in claim 3 further comprising a split collar secured over one of the studs, the split collar functioning to take up the space between the stud and the hollow pipe.

5. The post assembly as described in claim 3 further comprising a safety cable rail connected to the pipe for use in guiding the safety line.

6. The post assembly as described in claim 3 wherein the post assembly is secured only to an upper surface of a structural beam.

7. The post assembly as described in claim 3 wherein the post assembly is in tension.

8. A temporary support system for a safety line on a high rise structure the system comprising:

a generally horizontal support beam;

a plurality of spaced studs extending generally perpendicular to the support beam, each of the studs having an enlarged head;

a plurality of support posts for coupling to selected ones of said studs, each of said posts including a clamping block having an internal bore secured over the head of the selected stud, and clamping means in operative relationship with said post for binding said post to said stud; and retaining means attached to said post for coupling a safety line thereto.

9. The support system of claim 8 and including a split spacer ring position about said stud for aligning said post thereon.

10. The support system of claim 8 and including a support bracket at opposite ends of said plurality of support posts, said support bracket being coupled to respective ones of said studs, a cable extending from each of said brackets to an adjacent support post for tensioning said posts and the safety line extending between said brackets through flanges on said support posts.

* * * * *

UNITED STATES PATENT AND TRADEMARK OFFICE
CERTIFICATE OF CORRECTION

PATENT NO.    : 6,412,598 B1
DATED         : July 2, 2002
INVENTOR(S)   : Alan Mackinnon It is certified that error appears in the above-identified patent and that said Letters Patent is hereby corrected as shown below:

<u>Column 7,</u>
Line 35, delete "adapter" and insert therefor -- adapted --.

Signed and Sealed this

Fourth Day of February, 2003

JAMES E. ROGAN
*Director of the United States Patent and Trademark Office*